(12) United States Patent
Majumder et al.

(10) Patent No.: US 11,283,263 B2
(45) Date of Patent: Mar. 22, 2022

(54) MICROGRID SEGMENTATION

(71) Applicant: Hitachi Energy Switzerland AG, Baden (CH)

(72) Inventors: Ritwik Majumder, Västerås (SE); Antonis Marinopoulos, Alkmaar (NL)

(73) Assignee: Hitachi Energy Switzerland AG, Baden (CH)

( * ) Notice: Subject to any disclaimer, the term of this patent is extended or adjusted under 35 U.S.C. 154(b) by 8 days.

(21) Appl. No.: 15/776,722

(22) PCT Filed: Dec. 11, 2015

(86) PCT No.: PCT/EP2015/079451
§ 371 (c)(1),
(2) Date: May 16, 2018

(87) PCT Pub. No.: WO2017/097380
PCT Pub. Date: Jun. 15, 2017

(65) Prior Publication Data
US 2018/0301903 A1 Oct. 18, 2018

(51) Int. Cl.
*H02J 3/38* (2006.01)
*H02J 7/00* (2006.01)
(Continued)

(52) U.S. Cl.
CPC ............ *H02J 3/381* (2013.01); *G05B 19/042* (2013.01); *H02J 3/0073* (2020.01); *H02J 3/14* (2013.01);
(Continued)

(58) Field of Classification Search
CPC .. H02J 3/381; H02J 3/0073; H02J 3/14; H02J 7/0026; H02J 13/0017; H02J 3/388;
(Continued)

(56) References Cited

U.S. PATENT DOCUMENTS 9,026,260 B1 5/2015 Thornley et al.
2007/0005193 A1 1/2007 Nelson et al.
(Continued)

FOREIGN PATENT DOCUMENTS

CN 102280885 B 7/2013
CN 103248066 A 8/2013
(Continued)

OTHER PUBLICATIONS

International Preliminary Report on Patentability Applicaiton No. PCT/EP2015/079451 dated Mar. 22, 2018 9 pages.
(Continued)

*Primary Examiner* — Tejal Gami
(74) *Attorney, Agent, or Firm* — Slater Matsil, LLP

(57) ABSTRACT

A method of controlling a microgrid arrangement including a microgrid having a plurality of switches, and a plurality of Distributed Generators arranged for being connected to the microgrid. The method includes obtaining information about the microgrid arrangement. The method also includes, based on the obtained information, dynamically linking a first group of switches, of the plurality of switches, to each other. The method also includes detecting an event in the microgrid, and in response to the detection, automatically opening closed switches in the first group, whereby a first segment of the microgrid is disconnected from a second segment of the microgrid.

20 Claims, 3 Drawing Sheets

(51) Int. Cl.
   *H02J 3/00*    (2006.01)
   *G05B 19/042*  (2006.01)
   *H02J 3/14*    (2006.01)
   *H02J 13/00*   (2006.01)

(52) U.S. Cl.
   CPC ........ *H02J 7/0026* (2013.01); *H02J 13/0017* (2013.01); *G05B 2219/2639* (2013.01); *H02J 3/388* (2020.01)

(58) Field of Classification Search
   CPC .. H02J 7/0029; H02J 2300/10; H02J 2310/10; G05B 19/042; G05B 2219/2639; Y02B 70/3225; Y04S 20/222
   See application file for complete search history.

(56) References Cited

U.S. PATENT DOCUMENTS

| | | |
|---|---|---|
| 2011/0248569 A1 | 10/2011 | Son et al. |
| 2011/0282507 A1 | 11/2011 | Oudalov et al. |
| 2012/0104847 A1 | 5/2012 | Roscoe et al. |
| 2013/0015703 A1 | 1/2013 | Rouse et al. |
| 2013/0077367 A1 | 3/2013 | Zhu et al. |
| 2013/0286521 A1 | 10/2013 | Park |
| 2014/0249686 A1 | 9/2014 | Brainard et al. |

FOREIGN PATENT DOCUMENTS

| | | |
|---|---|---|
| CN | 103872702 A | 6/2014 |
| CN | 104767182 A | 7/2015 |
| EP | 2600479 A1 | 6/2013 |
| WO | 2015090375 A1 | 6/2015 |

OTHER PUBLICATIONS

Issicaba D et al: "Islanding operation of active distribution grids using an agent-based architecture", Innovative Smart Grid Technologies Conference Europe (ISGT Europe), Gothenburg, 2010 IEEE PES, IEEE, Piscayaway, NJ, USA, Oct. 11, 2010, pp. 1-8.

International Search Report and Written Opinion of the International Searching Authority Application No. PCT/EP2015/079451 Completed: Jun. 22, 2016; dated Jul. 1, 2016 12 pages.

Da-Zhong Zheng et al: "Splitting strategies for islanding operation of large-scale power systems using OBDD-based methods", IEEE Transactions on Power Systems, IEEE Service Center, Piscataway, NJ, US, vol. 18, No. 2, May 1, 2003, pp. 912-923.

Written Opinion of the International Preliminary Examining Authority Application No. PCT/EP2015/079451 dated Jan. 9, 2018 8 Pages.

MICROGRID SEGMENTATION

TECHNICAL FIELD

The present disclosure relates to methods and devices for segmenting a microgrid comprising a plurality of distributed generators (DG) which are connected in said microgrid.

BACKGROUND

A microgrid is a localized grouping of electricity generation, energy storage, and loads that normally operates connected to a traditional centralized grid (macrogrid) via a point of common coupling (PCC). This single point of common coupling with the macrogrid can be disconnected, islanding the microgrid. Microgrids are part of a structure aiming at producing electrical power locally from many small energy sources, DGs. In a microgrid, a DG is often connected via a converter which controls the output of the DG, i.e. the power injected into the microgrid.

A microgrid (in grid connected mode, i.e. connected to the macrogrid) supplies the optimized or maximum power outputs from the connected DG sites and the rest of the power is supplied by the macrogrid. The microgrid is connected to the macrogrid at a PCC through a controllable switch. This grid connection can be lost during faults and then the microgrid is islanded.

During islanding, there is a risk of power imbalance in the microgrid due to the loss of power import from the macrogrid as well as loss of voltage and/or frequency control by said macrogrid. For voltage/frequency control it is required to change control mode for at least one of the DGs, from power control in grid following mode to voltage and frequency control in grid forming mode. The power balancing is solved by fast storage action and immediate load shedding schemes.

System stability is a concern for microgrid operation. Stability issues may arise from power imbalance, lack of reactive support, erroneous control action, etc. Sudden loss of a component (e.g. DG) or part of network (e.g. faulted line isolation) may change the power balance as well as power flow within a microgrid significantly. This can also instigate stability issues.

With various types of DGs and loads, the requirement of power availability and power quality varies within a microgrid. To handle this, segmentation of the microgrid may be used, dividing the microgrid into smaller segments to achieve a stable and desired operation. The segmentation may be achieved with controllable switches, but with continuous change of power generation and/or power demand, it may not be possible to achieve segments which correspond well to each other.

SUMMARY

It is an objective of the present invention to achieve improved segmentation of a microgrid, in order to reduce the power imbalances arising in the remaining microgrid if a segment is disconnected there from. Embodiments of the invention may also allow different operating parameters such as power quality or frequency in different segments of the microgrid e.g. to retain maximum loads in the microgrid arrangement.

According to an aspect of the present invention, there is provided a method of controlling a microgrid arrangement comprising a microgrid comprising a plurality of switches, and a plurality of DGs arranged for being connected to the microgrid. The method comprises obtaining information about the microgrid arrangement. The method also comprises, based on the obtained information, dynamically linking a first group of switches, of the plurality of switches, to each other. The method also comprises detecting an event in the microgrid, and in response to the detection, automatically opening closed switches in the first group, whereby a first segment of the microgrid is disconnected from a second segment of the microgrid.

According to another aspect of the present invention, there is provided a computer program product comprising computer-executable components for causing a control arrangement to perform an embodiment of the method of the present disclosure when the computer-executable components are run on processor circuitry comprised in the control arrangement.

According to another aspect of the present invention, there is provided a microgrid arrangement comprising a microgrid comprising a plurality of switches, a plurality of DGs arranged for being connected to the microgrid, and a control arrangement for controlling operation of the microgrid arrangement. The control arrangement comprises processor circuitry, and storage storing instructions executable by said processor circuitry whereby said control arrangement is operative to obtain information about the microgrid arrangement. The control arrangement is also operative to, based on the obtained information, dynamically link a first group of switches, of the plurality of switches, to each other. The control arrangement is also operative to detect an event in the microgrid arrangement, and in response to the detection, automatically open closed switches in the first group, whereby a first segment of the microgrid is disconnected from a second segment of the microgrid.

By dynamically linking switches to each other, the disconnected segments formed in response to a detected event (if any) can be adjusted over time in view of changing properties or requirements in the microgrid arrangement. For instance, microgrid segments for different frequencies, power qualities, to support an essential load (which it is not desired to shed) etc. may be formed if segmentation is required in response to an event such as islanding or other imbalance of the microgrid. Also, by linking the switches to each other pre-emptively, before the event occurs, the segmentation may be performed without delay since there is no need to spend time on deciding how to segment the microgrid.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
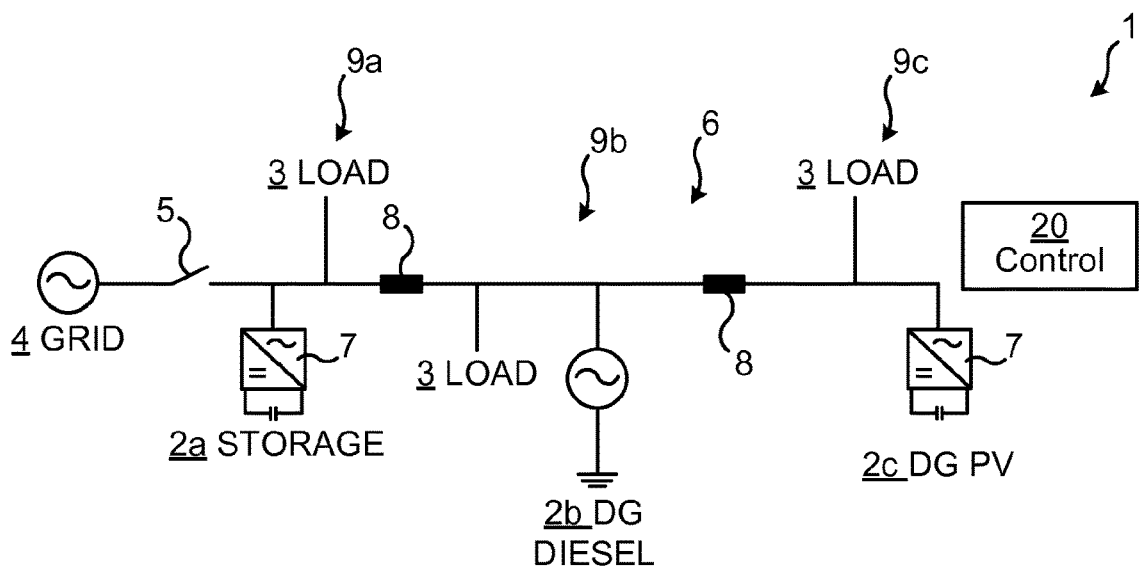
FIG. 1 is a schematic block diagram of an embodiment of a microgrid arrangement of the present invention.

FIG. 1 illustrates an embodiment of a microgrid arrangement 1 of the present disclosure. The microgrid arrangement 1 comprises a microgrid 6, connecting a plurality of DGs 2 and loads 3. In the figure, three different DGs are shown as an example, an energy storage 2a e.g. comprising a battery or flywheel or the like as part of an Energy Storage System (ESS) such as a Battery ESS (BESS), a Diesel generator 2b, and a photovoltaic (PV) power generator 2c. Some DGs, such as the energy storage 2a and the PV generator 2c produce direct current (DC) while, since the microgrid carries alternating current (AC), they are each connected to the microgrid 6 via DC to AC converter 7. The microgrid 6 is connected to a power grid 4 (e.g. a macrogrid such as a power distribution grid) via a main switch 5 e.g. a circuit breaker. When the main switch 5 is in a closed position, the microgrid is connected to the power grid, but when the main switch 5 is in an open position, the microgrid is islanded i.e. disconnected from the power grid. A plurality of switches 8 are comprised in the microgrid 6. By opening some or all of these switches, the microgrid can be segmented into a plurality of segments 9, here three segments 9a, 9b and 9c. It is noted that in accordance with the present invention, there are typically a plurality of switches which are linked to each other which are opened in order to segment the microgrid (typically into a plurality of islanded segments). FIG. 1 is thus highly simplified. Each segment 9 may comprise at least one DG 2 and at least one load 3, and may operate under different conditions than other segments 9 from which it is disconnected (i.e. the segments may be islanded). The microgrid arrangement 1 also comprises a control arrangement 20 (see also FIGS. 2a and 2b) for controlling the operation of the microgrid arrangement, especially the operations of the switches 8 in accordance with the present invention, but also e.g. the output of the DGs 2 to the microgrid 6. The control arrangement may be a central control and/or be distributed such as physically located in the respective switches 8. The control arrangement or at least a part thereof may be located away from the microgrid 6 e.g. in a control room.

Figure 2A:
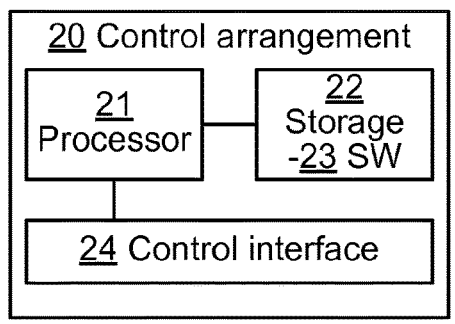
FIG. 2a is a schematic block diagram of an embodiment of a control arrangement in accordance with the present invention.

FIG. 2a schematically illustrates an embodiment of a control arrangement 20 of the present disclosure. The control arrangement 20 comprises processor circuitry 21 e.g. a central processing unit (CPU). The processor circuitry 21 may comprise one or a plurality of processing units in the form of microprocessor(s). However, other suitable devices with computing capabilities could be comprised in the processor circuitry 21, e.g. an application specific integrated circuit (ASIC), a field programmable gate array (FPGA) or a complex programmable logic device (CPLD). The processor circuitry 21 is configured to run one or several computer program(s) or software (SW) 23 stored in a data storage 22 of one or several storage unit(s) e.g. a memory. The storage unit is regarded as a computer readable means as discussed herein and may e.g. be in the form of a Random Access Memory (RAM), a Flash memory or other solid state memory, or a hard disk, or be a combination thereof. The processor circuitry 21 may also be configured to store data in the storage 22, as needed. The control arrangement 20 also comprises a control interface e.g. for sending control signals to the switches (8) of the microgrid 6 as well as for receiving sensor signals from sensors measuring voltages and/or currents and the like in the microgrid.

Figure 2B:
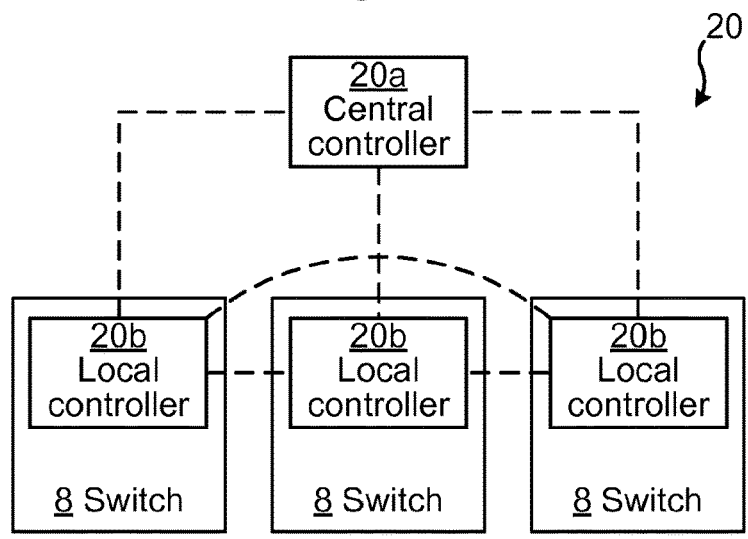
FIG. 2b is a schematic block diagram of an embodiment of a control arrangement comprising local switch controllers in accordance with the present invention.

FIG. 2b is a schematic block diagram of an embodiment of a control arrangement 20. In this embodiment, the control arrangement comprises a central controller 20a, which may be co-located with the microgrid 6 (e.g. in the vicinity thereof) or located away from the microgrid, e.g. in a control room. The central controller is connected to (able to communicate with), by wire or wirelessly, a plurality of local controllers 20b. The local controllers are distributed around the microgrid and may e.g. be local controllers of the switches 8 in the microgrid. Thus, each of the local controllers 20b may control a respective switch 8 and may e.g. be physically comprised in/located in or with said switch while functionally being comprised in the control arrangement 20. Each of the local controllers 20b may be controlled by the central controller 20a. In accordance with the present invention, the central controller may e.g. be responsible for the linking of switches 8 to each other (forming the first group of linked switches) and may instruct the local switches 20b of the linked switches accordingly. In addition, the local switches 20b may also be able to communicate with each other directly (not having to communicate via the central controller), as indicated by the dashed lines there between. Thus, a local controller may e.g. signal information about its present status, e.g. whether its switch 8 is open or closed, to all or some of the other local controllers in the microgrid, e.g. to the local controllers of switches 8 which its switch is linked to.

In accordance with the invention, a set/group of breakers 8 are operated to segment the microgrid 6 following an event, e.g. an operation of a switch 8 or the main switch/breaker 5. An aim is to sectionalize the microgrid during the event e.g. islanding, voltage collapse, power quality issues or other instabilities. Generally, the event could e.g. be a fault within the microgrid 6, a fault in the power grid 4 which affects the microgrid, or any tripping of microgrid assets such as a load 3 or a DG 2 e.g. a photovoltaic or wind turbine generator or an energy storage e.g. including a battery. Alternatively, the event could be an operation/status (e.g. opening or closing) of a switch 8 or the main switch/breaker 5. For instance, if one (any of or a master switch) of the interlinked switches 8 in the first group, opens or closes (i.e. a detected event) all or some of the other switches in the first group may automatically open and/or close.

Since a variable set of switches 8 are linked together in a group, with a master switch or in a microgrid segment for segmentation of the microgrid, the linking is dynamic over time. This may be done for each switch 8 and each segment 9 in the microgrid 6. The group of linked switches 8 may be operated automatically in direct response to operation of the master switch. Alternatively, the group of linked switches 8 may be operated in response to any other event occurring within a zone of the microgrid which corresponds to a segment 9 with which the group of switches is associated.

The dynamic linking of switches to each other may be changed, updated or recalculated with a predetermined periodicity, continually or as needed (e.g. in response to a change in properties or set up of the microgrid arrangement 1). Thus, different switches may be linked to each other in the first group during different time periods.

When selecting which switches 8 to be linked to each other, an objective may be e.g. to isolate a critical load 3 (e.g. for protecting the critical load from an imbalance in the microgrid), to segment the microgrid 6 to provide better power quality (in terms of voltage and frequency) in a segment 9 of the microgrid 6, to avoid larger load dynamics throughout the microgrid, to operate different segments 9 of the microgrid at different frequencies, and/or to turn down/off a segment of the microgrid until a grid forming DG (e.g. the diesel generator 2b) has been able to stabilize the microgrid e.g. during islanding. The switches 8 to be included in the first group (and thus be linked to each other) may be selected based on e.g. DG and load powers at different points in the microgrid, State-of-Charge (SoC) of an energy storage 2a in the microgrid arrangement 1, and/or power transfer over the Point of Common Coupling (PCC) at the main breaker 5 between the power grid 4 and the microgrid 6.

Figure 3:
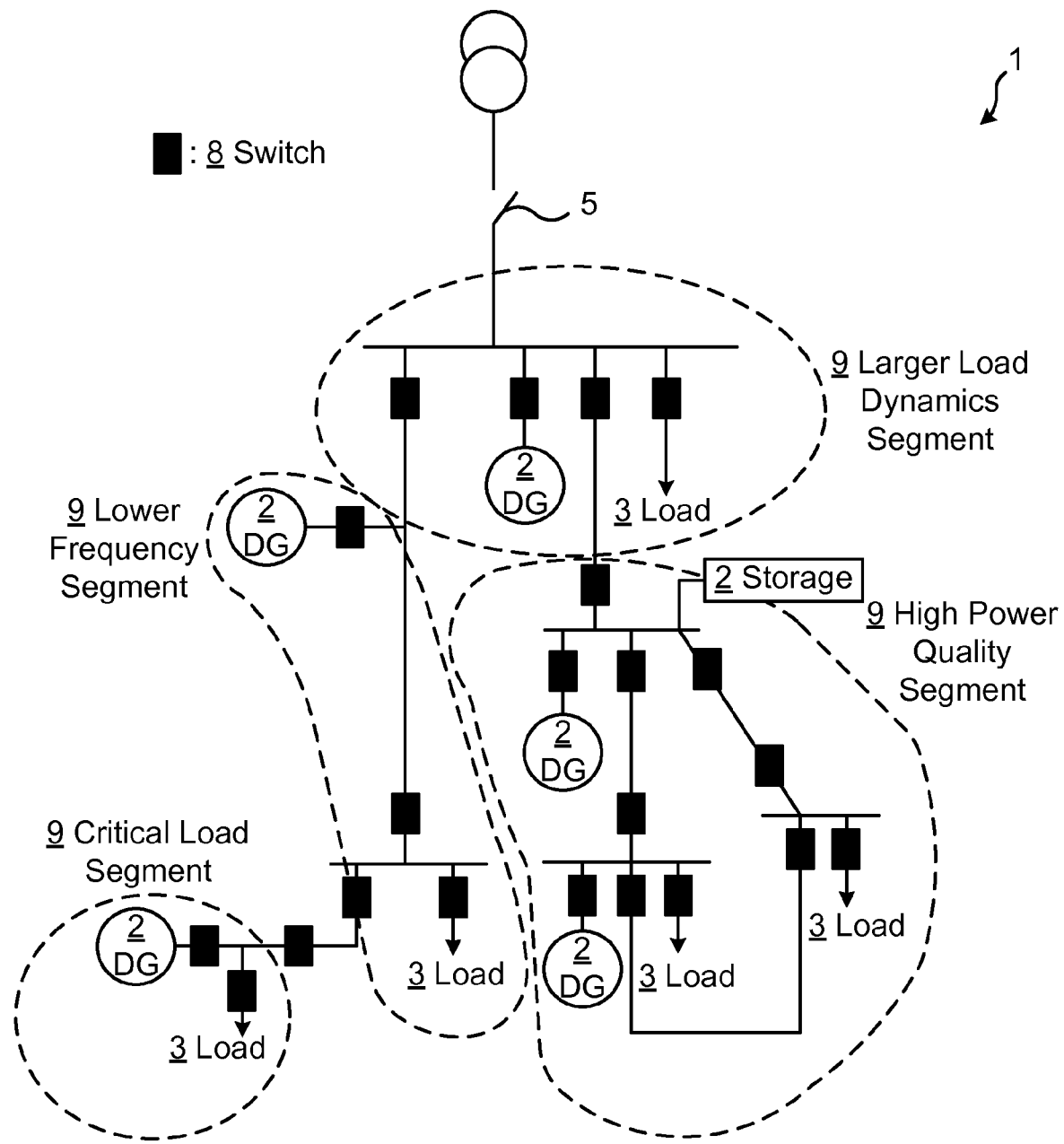
FIG. 3 illustrates an example embodiment of a microgrid divided into a plurality of segments in accordance with the present invention.

FIG. 3 schematically illustrates an embodiment of a microgrid arrangement 1 which is divided into zones/segments 9 as indicated by the dashed lines. Numerous switches 8 are comprised in different parts of the microgrid 6 and are in the figure represented by solid black rectangles. Some or all of the switches 8 within a segment 9 may be linked to each other to form a group of switches. The boundaries of the segments may change over time whereby the linking and the members of the groups are also dynamically changed. If some or all of the linked switches in a group opens, the segment 9 with which the group is related is disconnected from the rest of the microgrid (i.e. from the other segments). When the microgrid arrangement has been segmented such that the different segments 9 are disconnected from each other (and thus islanded), each segment may be operated with its own parameters. Some examples are given in the figure. For instance, one segment 9 may be operated with larger load dynamics, another segment with lower frequency, another segment with higher power quality, and yet another segment to handle a critical load.

Figure 4:
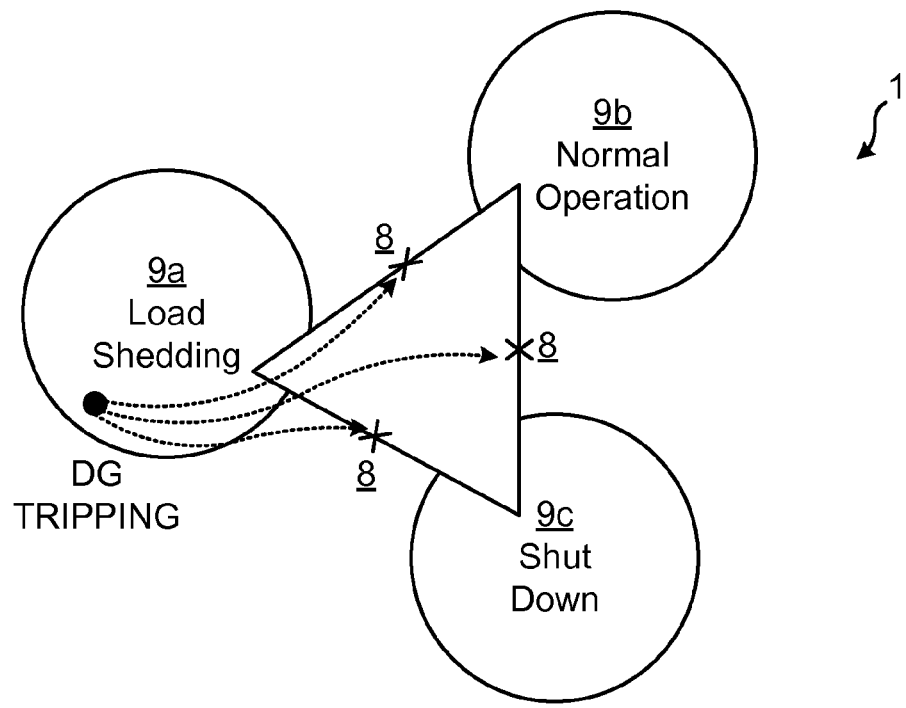
FIG. 4 schematically illustrates different actions taken in different segments of a microgrid in accordance with the present invention.

Similarly, FIG. 4 generally illustrates an example of a microgrid arrangement 1 in which switches 8 have been linked such that, in response to a DG tripping event, the microgrid is segmented (the segments disconnected from each other) by the linked switches automatically opening in response to the tripping. Thus, three islanded segments 9 are formed. In a first segment 9a, the islanding of the segment is handled by load shedding. The second segment 9b is able to continue normal operation during islanding of the segment. The second segment may e.g. comprise an essential load 3 which is supported by an energy storage 2a or a diesel (or other back-up) generator 2b. The third segment 9c may e.g. be shut down.

The present invention may be implemented both in a centralized way and in a decentralized way. In the centralized way, the central controller 20a receives all the DG measurements such as of power, SoC and connected loads. Then, based on e.g. different criteria or priority, preselects the switches to be linked to each other, e.g. connected to a master switch to automatically open with the master switch opens. For example, switches 8 are linked to a master switch to form the first group of switches e.g. based on the powers and reserves in the microgrid arrangement. Once the master switch is opened (e.g. due to a fault in the microgrid), all the switches linked to it are opened, e.g. resulting in clearing the faulted line in the microgrid, segmenting the microgrid and dropping a load 3. While selection is done through the central controller 20a, operation information of the master switch is communicated to the linked switches directly through the local controllers 20b (e.g. of Intelligent Electronic Devices, IEDs).

In a decentralized way, all the DG measurements such as power, load demand and SoC are communicated to all the local controllers 20b (e.g. IEDs). Each of them may then calculate the suitable microgrid segmentation and pre-selects the switches to link in the first group. This information is communicated to the local controllers of the other switches in the first group or to all other local controllers in the microgrid 6. Thus, a central controller 20a may not be needed at all in the control arrangement 20. As an example, if the microgrid is islanded, the island information is communicated to the local controllers of the linked switches in the first group, which open the first group switches. Each local controller 20b may link its switch 8 with other switches or with segments of the microgrid based on measurements on the microgrid to form the first (and second, third etc.) group of switches. This linking may then be communicated to the other local controllers 20b in the microgrid or in a zone thereof. This linking could result in a switch 8 being comprised in both a first and a second group of interlinked switches, and may thus open or close in response to an event which affects either of the first and second groups.

Figure 5:
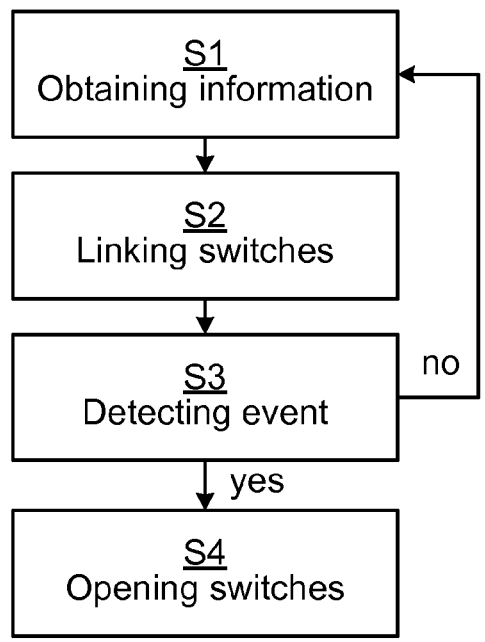
FIG. 5 is a schematic flow chart of an embodiment of the method of the present invention.

FIG. 5 is a schematic flow chart of an embodiment of the inventive method. The method is for controlling a microgrid arrangement 1 comprising a microgrid 6 comprising a plurality of switches 8, and a plurality of DGs 2 arranged for being connected to the microgrid 6. The method may be performed by a control arrangement 20. Information, e.g. sensor measurements, about the microgrid arrangement is obtained S1. Based on the obtained S1 information, a first group of switches of the plurality of switches 8 are dynamically linked S2 to each other. The steps S1 and S2 may be performed continuously or periodically (or as needed e.g. due to a change of the microgrid arrangement set-up) until an event is detected S3 in the microgrid 6. Then, in response to the detection S3 of the event, closed switches 8 in the first group of linked switches are automatically opened S4, whereby a first segment 9a of the microgrid is disconnected from a second segment 9b of the microgrid.

In some embodiments, at least one DG 2 of the plurality of DGs is connected or otherwise arranged for being connected to the first segment 9a. In addition, at least one load 3 may be connected or otherwise arranged for being connected to the first segment. In some embodiments, the event which is detected S3 is the disconnection of the at least one DG 2 from the first segment 9a, e.g. due to a fault in or at the DG.

Alternatively, in some embodiments, the event is the opening of a first (master) switch 8 of the first group of linked switches. In some embodiments, the automatically opening S4 of the linked switches comprises sending a signal from a local controller 20b of the first (master) switch 8 to respective local controllers 20b of the other switches 8 in the first group of linked switches.

Alternatively, the event is an instability in the microgrid, e.g. islanding of the microgrid 6.

In some embodiments, the first segment 9a is islanded by the opening S4 of the switches in the first group, thus possibly disconnected also from other segment(s)/part(s) of the microgrid than the second segment 9b.

In some embodiments, the obtained S1 information comprises sensor measurements on the microgrid 6, information about power generation of one or more of the DGs 2, and/or information about varying power quality requirements within the microgrid arrangement 1 (e.g. of different loads 3).

In some embodiments, the obtaining S1 information and linking S2 are performed periodically and/or continuously. This implies that the steps S1 and S2 are performed regardless of whether an event is detected S3.

In some embodiments, in response to the detection S3, automatically closing S4 open switches 8 in the first group. Thus, in addition to some or all closed switches in the first group being opened in response to the detection of the event, some or all switches in the first group which are opened may be closed. For instance, in order to improve operation within a segment 9 when it is islanded (disconnected from the reset of the microgrid) one or more switches may conveniently be closed in order to facilitate power balancing within the segment.

Embodiments of the present invention may be conveniently implemented in the control arrangement 20 using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product (e.g. the storage 22 or an external data storage) which is a non-transitory storage medium or computer readable medium (media) having instructions (e.g. SW 23) stored thereon/in which can be used to program a computer to perform any of the methods/processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of controlling a microgrid arrangement including a control arrangement and a microgrid including a plurality of switches and a plurality of Distributed Generators (DGs) arranged for being connected to the microgrid, each switch of the plurality of switches being configured to be controlled by a respective local controller, the method comprising:

obtaining information about the microgrid arrangement, wherein the obtained information includes sensor measurements on the microgrid, information related to power generation of one or more of the DGs, and/or information related to varying power quality requirements within the microgrid arrangement;

based on the obtained information, the control arrangement, dynamically over time, linking a first group of switches, of the plurality of switches, to each other, such that different switches, of the plurality of switches, are linked to each other in the first group during different time periods;

instructing the local controllers of the first group of switches that the switches of the first group are linked to each other;

after the linking, detecting an event in the microgrid; and in response to the detection, by direct communication between the local controllers of the first group of switches, automatically opening closed switches in the first group, whereby a first segment of the microgrid is disconnected from a second segment of the microgrid.

2. The method of claim 1, wherein at least one DG of the plurality of DGs is connected to the first segment before the event is detected.

3. The method of claim 2, wherein the event is disconnection of the at least one DG from the first segment.

4. The method of claim 1, wherein the event is the opening of a first switch of the first group.

5. The method of claim 4, wherein the opening includes sending a signal from a local controller of the first switch to respective local controllers of other switches in the first group.

6. The method of claim 1, wherein the event is an instability in the microgrid.

7. The method of claim 1, wherein the first segment is islanded by the opening of switches in the first group.

8. The method of claim 1, wherein obtaining the information and linking the first group of switches are performed periodically and/or continuously.

9. The method of claim 1, further comprising, in response to the detection, automatically closing open switches in the first group.

10. A computer program product including computer-executable components for causing a control arrangement to perform the method of claim 1 when the computer-executable components are run on processor circuitry included in the control arrangement.

11. A microgrid arrangement including:

a microgrid including a plurality of switches, each switch of the plurality of switches being configured to be controlled with a respective local controller;

a plurality of Distributed Generators (DGs) arranged for being connected to the microgrid; and a control arrangement including the respective local controllers for each of the switches, for controlling operation of the microgrid arrangement, the control arrangement including processor circuitry and storage storing instructions executable by the processor circuitry so that the control arrangement is operative to:

obtain information about the microgrid arrangement, wherein the obtained information includes sensor measurements on the microgrid, information related to power generation of one or more of the DGs, and/or information related to varying power quality requirements within the microgrid arrangement;
based on the obtained information, dynamically over time link a first group of switches, of the plurality of switches, to each other, such that different of the plurality of switches are linked to each other in the first group during different time periods, the dynamic linking of switches to each other being subject to change, update or recalculation with a predetermined periodicity, continually or in response to a change in a property or setup of the microgrid arrangement;
instruct the local controllers of the first group of switches that the switches of the first group are linked to each other;
after the linking, detect an event in the microgrid arrangement; and
in response to the detection, by direct communication between the local controllers of the first group of switches, automatically cause closed switches in the first group to open so that a first segment of the microgrid will be disconnected from a second segment of the microgrid.

12. The method of claim 6, wherein the event is an islanding of the microgrid.

13. The method of claim 1, wherein obtaining the information and causing the first group of switches to be linked are performed continuously.

14. A microgrid arrangement comprising:
a central controller;
a microgrid including a plurality of switches;
a plurality of local controllers, each local controller associated with a respective one of the switches; and
a plurality of Distributed Generators (DGs) arranged for being connected to the microgrid;
wherein the central controller is configured to:
obtain information about the microgrid arrangement, wherein the obtained information includes sensor measurements on the microgrid, information related to power generation of one or more of the DGs, and/or information related to varying power quality requirements within the microgrid arrangement;
based on the obtained information, cause a first group of switches of the plurality of switches to be linked to each other dynamically over time such that different switches of the plurality of switches are linked to each other in the first group during different time periods; and
instruct the local controllers of the first group of switches that the switches of the first group are linked to each other; and
wherein the local controllers associated with the switches of the first group of switches are configured to:
detect an event in the microgrid; and
in response to the detection, by direct communication between the local controllers associated with the switches of the first group of switches, automatically open closed switches in the first group such that a first segment of the microgrid will be disconnected from a second segment of the microgrid, the direct communication performed without communicating via the central controller.

15. The microgrid arrangement of claim 14, wherein at least one DG of the plurality of DGs is connected to the first segment before the event is detected.

16. The microgrid arrangement of claim 15, wherein the event is disconnection of the at least one DG from the first segment.

17. The microgrid arrangement of claim 14, wherein the event is the opening of a first switch of the first group and wherein the local controllers are configured to automatically open closed switches by sending a signal from a local controller of the first switch to respective local controllers of other switches in the first group.

18. The microgrid arrangement of claim 14, wherein the central controller is configured to obtain the information and cause the first group of switches to be linked on a periodic basis.

19. The microgrid arrangement of claim 14, wherein the central controller is configured to obtain the information continuously and cause the first group of switches to be linked based on the obtained information.

20. The method of claim 1, wherein the dynamic linking of switches to each other being subject to change, update or recalculation with a predetermined periodicity, continually or in response to a change in a property or setup of the microgrid arrangement.

* * * * *